United States Patent [19]

King

[11] Patent Number: 4,926,655
[45] Date of Patent: May 22, 1990

[54] AIR CONDITIONER UNIT SUITABLE FOR MOUNTING ON THE ROOF OF A VEHICLE

[75] Inventor: Donald D. King, Chanhassen, Minn.

[73] Assignee: Thermo King Corporation, Minneapolis, Minn.

[21] Appl. No.: 345,854

[22] Filed: May 1, 1989

[51] Int. Cl.$^5$ .............................................. B60H 1/32
[52] U.S. Cl. ................................. 62/244; 62/DIG. 16
[58] Field of Search .............. 62/DIG. 16, 244, 259.1; 98/31; 165/47, 53

[56] References Cited

U.S. PATENT DOCUMENTS

| | | | |
|---|---|---|---|
| 3,848,428 | 11/1974 | Rieter, Jr. | 62/244 X |
| 3,885,398 | 5/1975 | Dawkins | 62/244 X |
| 3,984,224 | 10/1976 | Dawkins | 62/89 |
| 4,043,143 | 8/1977 | Fluder et al. | 62/243 |
| 4,051,691 | 10/1977 | Dawkins | 62/244 X |
| 4,134,275 | 1/1979 | Erickson | 62/244 |
| 4,201,064 | 5/1980 | Krug et al. | 62/244 X |
| 4,592,207 | 6/1986 | Rummel | 62/244 |
| 4,727,728 | 3/1988 | Brown | 62/244 |
| 4,732,011 | 3/1988 | Haiya | 62/239 |
| 4,748,825 | 6/1988 | King | 62/244 |
| 4,787,210 | 11/1988 | Brown | 62/89 |

Primary Examiner—Lloyd L. King
Attorney, Agent, or Firm—D. R. Lackey

[57] ABSTRACT

A compact air conditioner unit suitable for mounting on the roof of a bus. The unit has a frame which has a shallow height dimension for appearance and reduced drag, and a length dimension which enables the unit to be securely mounted between any two adjacent structural support struts of the vehicle. The air conditioner unit achieves compactness without loss of necessary evaporator and condenser coil surface area by splitting both the evaporator and condenser functions into two coils. Two evaporator coils are spaced laterally apart on the frame, and two condenser coils are nested between the spaced evaporator coils, such that midpoints of the condenser and evaporator coils lie in a common plane perpendicular to the sides of the vehicle. Condenser fans are mounted between the spaced condenser coils, and evaporator blowers are mounted outside each evaporator coil, between each evaporator coil and an adjacent side of the frame.

11 Claims, 4 Drawing Sheets

4,926,655

AIR CONDITIONER UNIT SUITABLE FOR MOUNTING ON THE ROOF OF A VEHICLE

TECHNICAL FIELD

The invention relates in general to air conditioner units, and more specifically to an air conditioner unit suitable for mounting on the roof of a vehicle, such as a bus.

BACKGROUND ART

Air conditioner units for mounting on the roof of a vehicle typically spread the condenser and evaporator functions into two or more separate packages, requiring considerable roof space as well as creating air drag. Roof mounted air conditioner units which incorporate both the evaporator and condenser functions in a single package limit coil surface area, particularly condenser coil surface area, limiting the capacity of the unit.

It would be desirable and it is an object of the invention to provide an air conditioner unit which includes both evaporator and condenser functions in a single compact package having a length dimension small enough to enable the unit to be mounted between any two adjacent structural beams of a vehicle, at the front, back, or intermediate the front and back of the vehicle, while providing sufficient evaporator and condenser coil surface area in the single package to enable the unit to satisfy the cooling demands of a typical transit bus.

SUMMARY OF THE INVENTION

Briefly, the present invention is a new and improved air conditioner unit having a single compact frame which houses the evaporator and condenser functions of the unit. The frame has a shallow height dimension for reduced air drag and appearance, i.e., about 10 inches (254 mm), and a length dimension measured in a direction between the front and back of the associated vehicle which permits the unit to be securely mounted between any two adjacent roof struts or beams, which are typically about 50 inches (1270 mm) apart.

The compact assembly is achieved without sacrificing coil surface area and thus cooling capacity, by splitting both the evaporator and condenser functions into first and second coils each. The first and second evaporator coils are mounted in laterally spaced relation on a metallic frame which has a bottom, top, first and second sides, and first and second ends. The first and second evaporator coils are respectively disposed in predetermined spaced relation relative to the first and sides of the frame, with face planes of the evaporator coils which are perpendicular to air flow through the coils being vertically oriented.

First and second evaporator blower assemblies are respectively mounted between the first and second evaporator coils and the adjacent first and second sides of the frame. The first and second evaporator blower assemblies draw return air from a passenger compartment of the vehicle into first and second evaporator compartments or plenums defined by the frame, via openings in the roof of the vehicle. The first and second evaporator blower assemblies draw the return air through the first and second evaporator coils, respectively, and the first and second evaporator blower assemblies then discharge evaporator conditioned air into air distribution ducts of the associated vehicle which run along the intersections of the sides and ceiling, between the front and back of the vehicle.

The first and second condenser coils are mounted in laterally spaced relation, between the first and second evaporator coils, with face planes of the condenser coils which are perpendicular to air flow through the coils being horizontally oriented. The first and second condenser coils are in registry with openings in the top of the frame.

First and second condenser fans are mounted between the first and second condenser coils, in registry with openings in the top of the frame. The condenser fans are spaced front to back, relative to the orientation of the air conditioner unit on the vehicle, instead of being laterally spaced. The first and second condenser fans are arranged to draw ambient or outside air vertically downward into a condenser compartment or plenum defined by the frame, where the air flows over the fan motors, cooling the motors. The downwardly flowing ambient air then divides into two laterally spaced paths, with each path turning the air and forcing the air vertically upward through the first and second condenser coils and the associated frame openings, rejecting condenser heat to the atmosphere.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
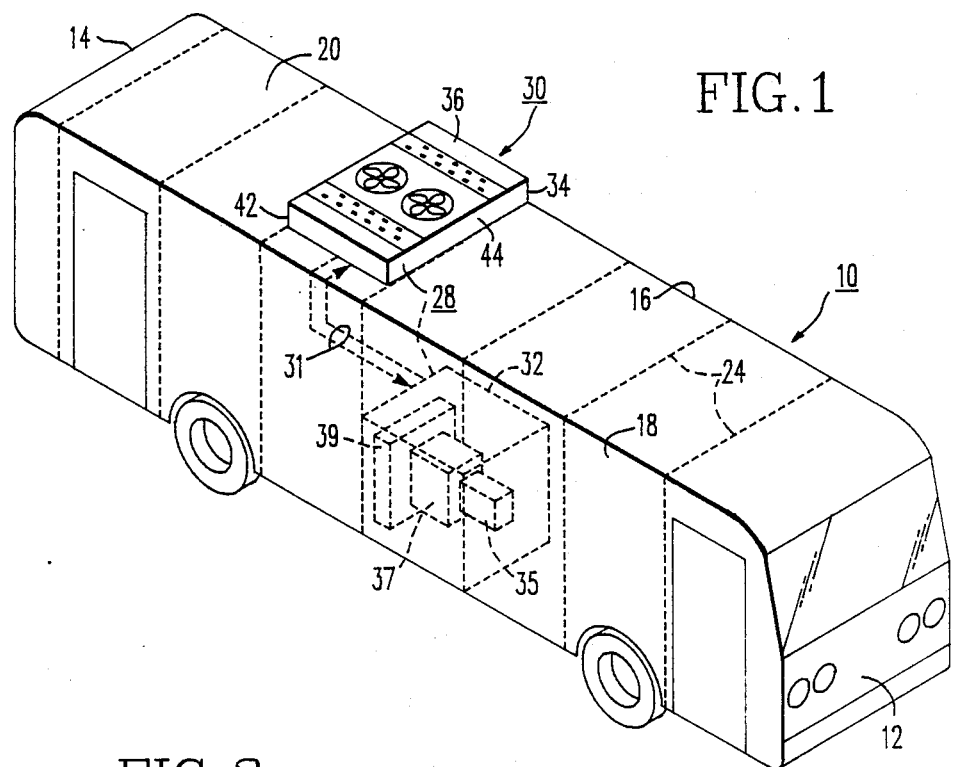
FIG. 1 is a perspective view of a bus illustrating spaced structural support struts or beams, and an air conditioner unit on the roof of the bus, which is constructed according to the teachings of the invention, disposed between and securely fixed to two adjacent support struts of the bus.
Figure 5:
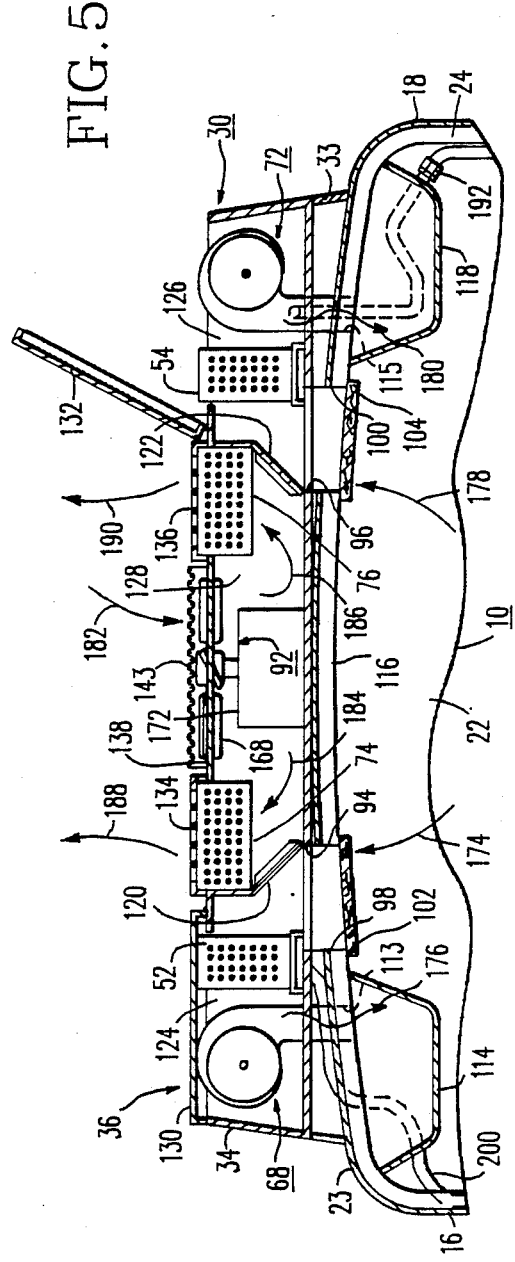
FIG. 5 is a cross sectional view of the air conditioner unit shown in FIG. 4, taken between and in the direction of arrows V—V in FIG. 4.

Referring now to the drawings, and to FIG. 1 in particular, there is shown a vehicle 10, such as a transit bus, having a front 12, back 14, first and second sides 16 and 18, respectively, a roof 20, and a passenger compartment 22 best shown in FIG. 5. The bus structure which supports an outer skin 23 (FIG. 5) includes a plurality of inverted U-shaped struts or beams 24, shown with broken lines in FIG. 1, which are typically spaced about 50 inches (1270 mm) apart from the front 12 to the back 14 of the bus 10. Horizontal structural members, such as horizontal member 26 (FIG. 6), extend between the U-shaped struts 24.

Bus 10 includes an air conditioner system 28 comprising a single air conditioner unit 30 and a power pack 32. The power pack 32, which may be conventional, is mounted within the bus 10, adjacent to one of the bus sides, such as side 18 as illustrated. As is well understood in the art, the power pack 32 includes a refrigerant compressor 35 and a prime mover, such as an internal combustion engine 37 having a radiator 39.

Air conditioner unit 30 is mounted on the roof 20 of bus 10 by any suitable means 33, with unit 30 extending between and securely fixed to any two adjacent support struts or beams 24 and horizontal members 26. Unit 30 may be mounted adjacent the front 12 of bus 10, adjacent the rear 14, or intermediate the front and rear, as illustrated in FIG. 1.

Figure 3:
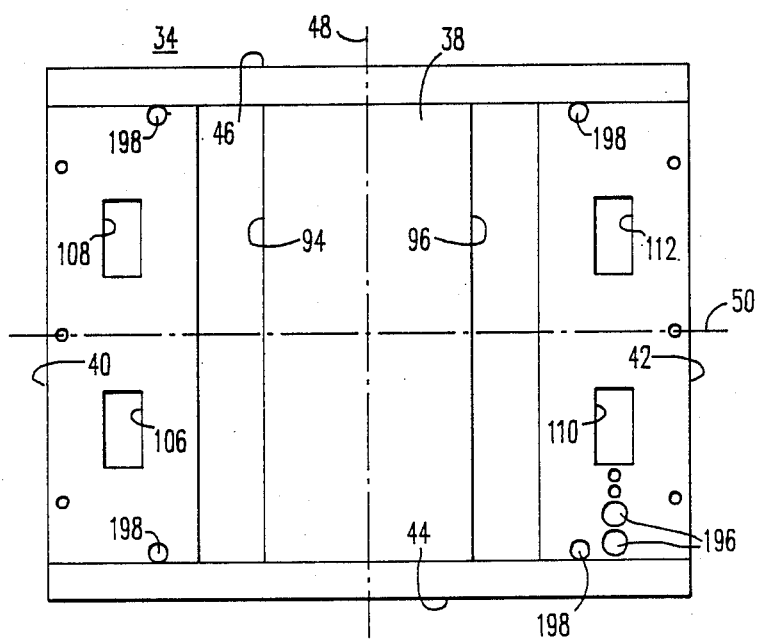
FIG. 3 is a bottom view of the frame of the air conditioner shown in FIGS. 1 and 2, illustrating openings therein which are in communication with openings in the roof of the bus shown in FIG. 1.
Figure 2:
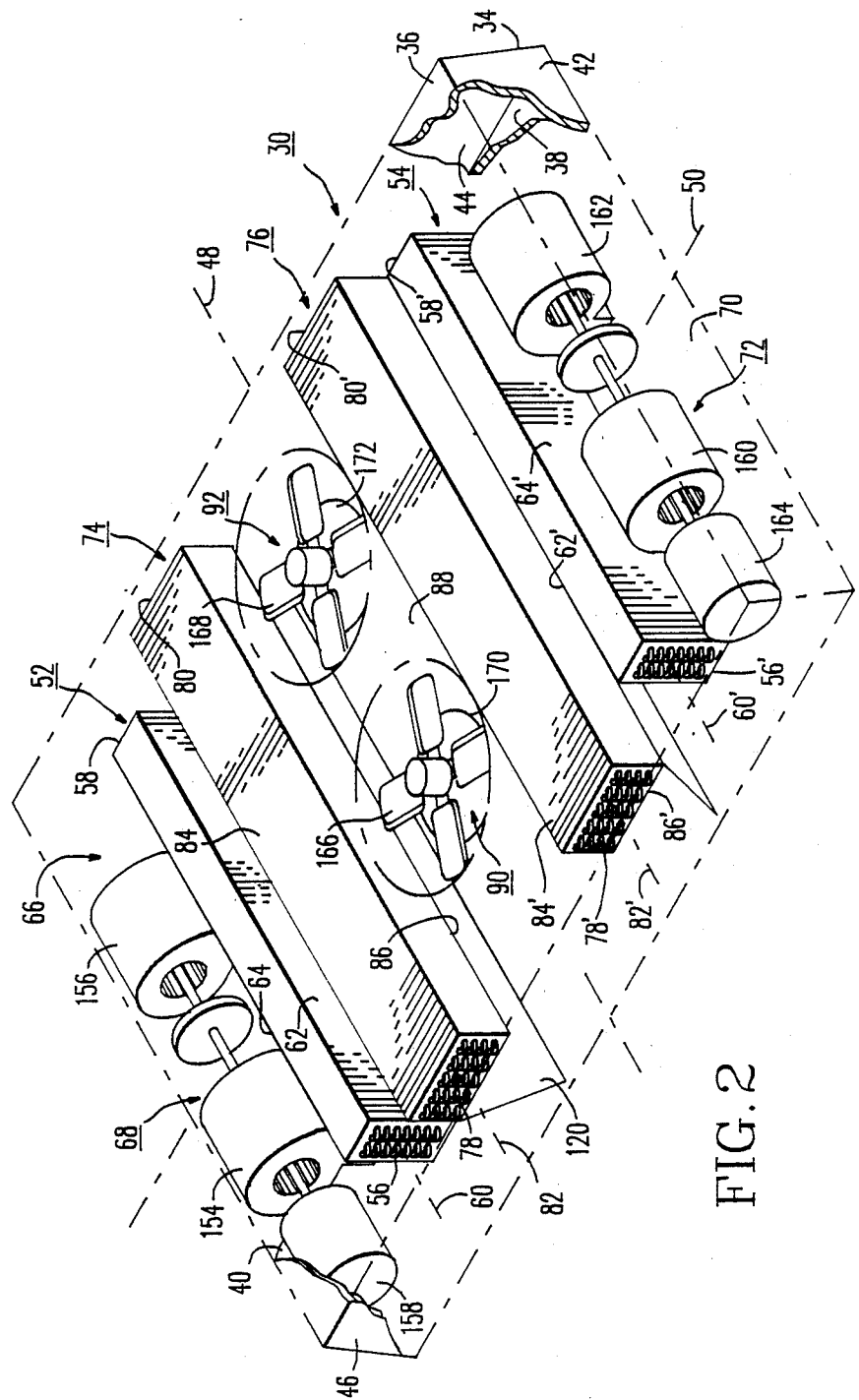
FIG. 2 is a perspective view of the air conditioner unit shown in FIG. 1, with the frame shown mostly in phantom in order to more clearly illustrate the components of the air conditioner unit and their relative positions.

Air conditioner unit 30, as shown in FIG. 2, includes a metallic frame 34 having a top 36, bottom 38, first and second sides 40 and 42, first and second ends 44 and 46, and a longitudinal axis 48 which extends between the ends. Longitudinal axis 48 is oriented in a direction which parallels a front-to-back dimension of bus 10. A central axis transverse to longitudinal axis 48 is indicated at 50 in FIGS. 2 and 3. FIG. 3 is a bottom view of frame 34. Frame 34 is dimensioned such that it has a length dimension between ends 44 and 46 which is slightly greater than the dimension between roof struts 24, e.g., about 55 inches (1397 mm), a width dimension between sides 40 and 42 which is less than the width of bus 10, e.g., about 76 inches (1930 mm), and a height dimension of about 10 inches (254 mm).

FIG. 2 is a perspective view of air conditioner unit 30, with frame 34 being mostly shown in phantom in order to illustrate the components of the unit more clearly. FIGS. 3 through 6 will also be referred to while describing unit 30, with FIGS. 4 through 6 being plan, cross-sectional and side elevational views, respectively, of unit 30.

More specifically, air conditioner unit 30 includes an evaporator function in the form of first and second elongated evaporator coils 52 and 54, respectively. Evaporator coil 52 has first and second ends 56 and 58, a longitudinal axis 60 which extends between the ends, and major opposed air entry and exit face planes 62 and 64, respectively. Evaporator coil 54 is of like construction and its components are identified with like reference numerals with a prime mark.

Evaporator coils 52 and 54 are mounted on frame 34 in laterally spaced relation relative to longitudinal axis 48. The longitudinal axes 60 and 60' of evaporator coils 52 and 54 are oriented parallel with the longitudinal axis 48 of frame 34, and the face planes 62 and 64 are vertically oriented.

Evaporator coil 52 is spaced from side 40 of frame 34 to provide a pocket or space 66 between exit face plane 64 and side 40 in which a first evaporator air delivery assembly 68 is mounted. In like manner evaporator coil 54 is spaced from side 42 to provide a space 70 between exit face plane 64' and side 42 in which a second evaporator air delivery assembly 72 is mounted.

Air conditioner unit 30 includes a condenser function in the form of first and second elongated condenser coils 74 and 76. Condenser coil 74 has first and second ends 78 and 80, a longitudinal axis 82 which extends between the ends, and major opposed air entry and exit face planes 86 and 84 respectively. Condenser coil 76 is of like construction and its components are identified with like reference numerals with a prime mark.

Condenser coils 74 and 76 are mounted on frame 34 in laterally spaced relation relative to longitudinal axis 48. The longitudinal axes 82 and 82' of condenser coils 74 and 76 are oriented parallel with the longitudinal axis 48 of frame 34, and the face planes 84 and 86 are horizontally oriented. The midpoints of evaporator coils 52 and 54 and the midpoints of condenser coils 74 and 76 lie on a common vertically oriented plane which extends perpendicularly between the sides 40 and 42 of frame 34, i.e., a vertical plane which extends through transverse axis 50.

The spacing between condenser coils 74 and 76 defines a pocket or space 88 in which first and second condenser air delivery assemblies 90 and 92 are located. Instead of being laterally spaced, as are the prior components described, condenser air delivery assemblies 90 and 92 are spaced in the direction of longitudinal axis 48.

The bottom 38 of frame 34, shown in FIG. 3, includes elongated openings 94 and 96 which extend in the direction of longitudinal axis 48 for almost the complete length of frame 34. Openings 94 and 96 communicate with similar openings 98 and 100 (FIG. 5) in the roof 20 of bus 10 for receiving return air from the passenger compartment 22 of bus 10. Suitable filters 102 and 104 cover openings 98 and 100 on the bus ceiling side of roof 20. The bottom 38 of frame 34 also includes four smaller openings 106, 108, 110 and 112, with openings 106 and 108 being associated with the first evaporator air delivery assembly 68 and with openings 110 and 112 being associated with the second evaporator air delivery assembly 72. Openings 106 and 108 communicate with similar openings in roof 20 of bus 10, such as opening 113, which openings in turn are in communication with an air distribution duct 114 (FIG. 5) which runs along the ceiling 116 of bus 10, from the front to the back of the bus, adjacent the intersection of roof 20 and side 16 of bus 10. Openings 110 and 112 communicate with similar openings in roof 20 of bus 10, such as opening 115, which openings in turn are in communication with an air distribution duct 118 (FIG. 5) which runs along the ceiling 116 of bus 10, from the front to the back of the bus, adjacent the intersection of roof 20 and side 18 of bus 10.

Bulkheads 120 and 122, shown in FIGS. 2 and 5, divide frame 34 into first and second evaporator chambers or plenums 124 and 126 and a condenser chamber or plenum 128. Evaporator coil 52 and the first evaporator air delivery assembly 68 are disposed in the first evaporator plenum 124, evaporator coil 54 and the second evaporator air delivery assembly 72 are disposed in the second evaporator plenum 126, and the condenser coils 74 and 76 and condenser air delivery assemblies 90 and 92 are disposed in the condenser plenum 128.

Figure 4:
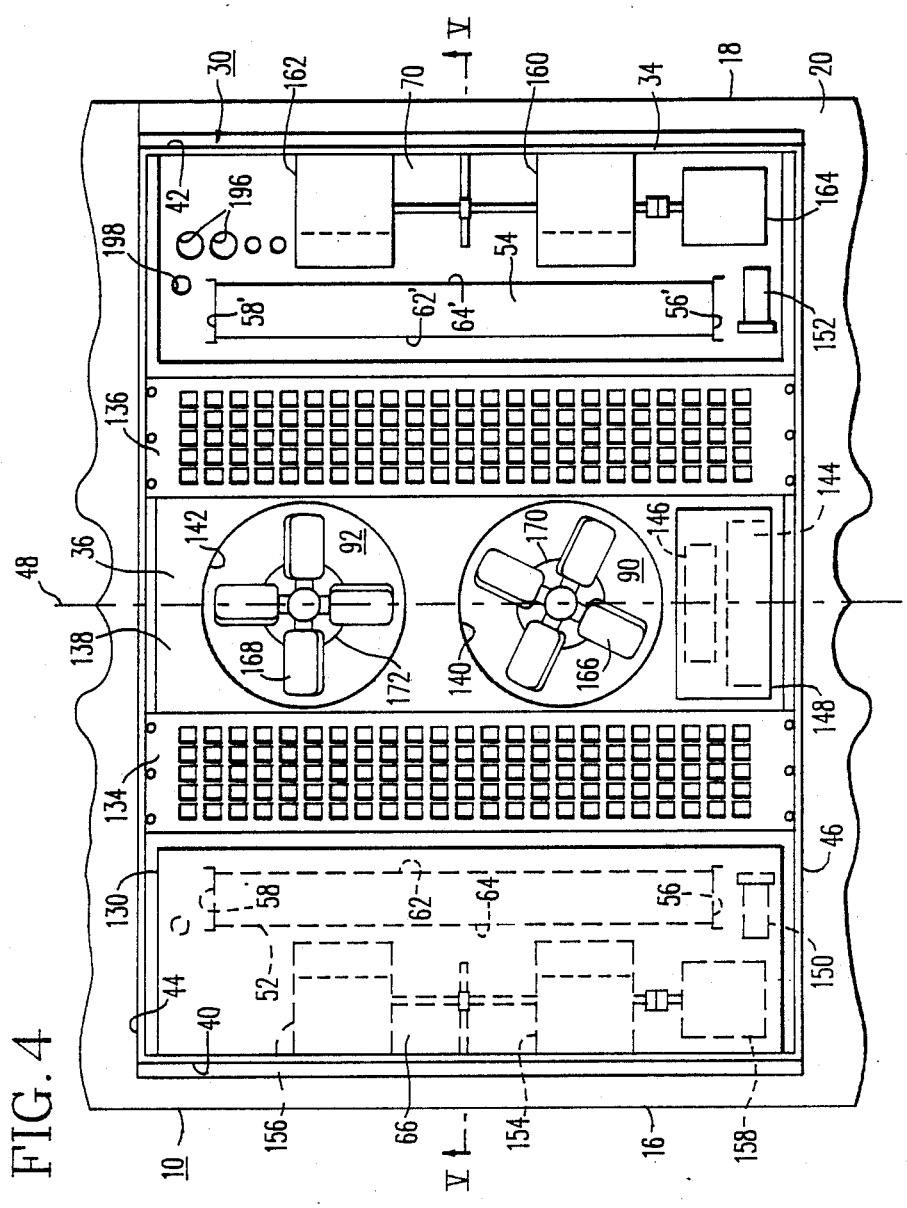
FIG. 4 is a plan view of the air conditioner unit shown in FIGS. 1 and 2.

As best shown in FIGS. 4 and 5, the top 36 of frame 34 includes a hinged access cover 130 over the first evaporator plenum 124, a hinged access cover 132 over the second evaporator plenum 126, removable grilles 134 and 136 disposed over condenser coils 74 and 76, respectively, and a flat metallic sheet member 138 disposed between grilles 134 and 136 which includes circular openings 140 and 142 associated with condenser air delivery assemblies 90 and 92, respectively. A protective screen 143 (FIG. 5) is disposed over openings 140 and 142. Certain of the refrigeration circuit components are mounted in the condenser compartment, such as a receiver 144 and a drier 146 shown in FIG. 4, and an access cover 148 is disposed to cover an opening in sheet member 138 which is located above these refrigeration circuit components. In a preferred embodiment of the invention, each evaporator coil 74 and 76 is controlled by a dedicated expansion valve 150 and 152, respectively, for correct operation of each evaporator coil. Expansion valves 150 and 152, as illustrated in FIG. 4, are mounted in evaporator plenums 124 and 126, and they are readily serviced via hinged covers 130 and 132, respectively.

The first evaporator air delivery assembly 68 preferably includes first and second forward curve, double inlet, centrifugal blowers 154 and 156 driven by an electric motor 158. The outlet sides of blowers 154 and 156 are disposed directly over openings 108 and 106, respectively, in the bottom 38 of frame 34. In like manner, the second evaporator air delivery assembly 72 includes first and second centrifugal blowers 160 and 162 driven by an electric motor 164. The outlet sides of blowers 160 and 162 are disposed directly over openings 112 and 110, respectively, in the bottom 38 of frame 34.

The first and second condenser air delivery assemblies 90 and 92 include axial flow fans having fan blades 166 and 168 respectively driven by electric motors 170 and 172.

As best illustrated in FIG. 5, return air from passenger compartment 22 of bus 10, indicated by arrow 174, is drawn upwardly through filter 102, through opening 98 in ceiling 116, through evaporator coil 52, and into the "eyes" of blowers 154 and 156. Blowers 154 and 156 discharge the evaporator conditioned air, indicated by arrow 176, downwardly into air distribution duct 114, where outlet ports controlled by passengers in bus 10 control distribution of conditioned air into the passenger compartment 22. In like manner, blowers 160 and 162 draw return air 178 from passenger compartment 22, upwardly through filter 104, through ceiling opening 100, through evaporator coil 54, and into the "eyes" of blowers 160 and 162. Blowers 160 and 162 discharge the evaporator conditioned air 180 downwardly into air distribution duct 118. It will be noted that the evaporator air flow paths through evaporator plenums 124 and 126 are very short, providing low losses and high efficiency.

The first and second condenser air delivery assemblies 90 and 92 have the fan blades 166 and 168 constructed and rotated to draw ambient air 182 downwardly into the condenser plenum 128, flowing over motors 170 and 172 before picking up heat rejected by condenser coils 74 and 76, to cool the motors. Ambient air 182 then divides into two flow paths 184 and 186 within condenser plenum 128, as the air is forced vertically upward through condenser coils 74 and 76. The ambient air picks up heat rejected by condenser coils 74 and 76, and is discharged vertically upward, as indicated by arrows 188 and 190.

Figure 6:
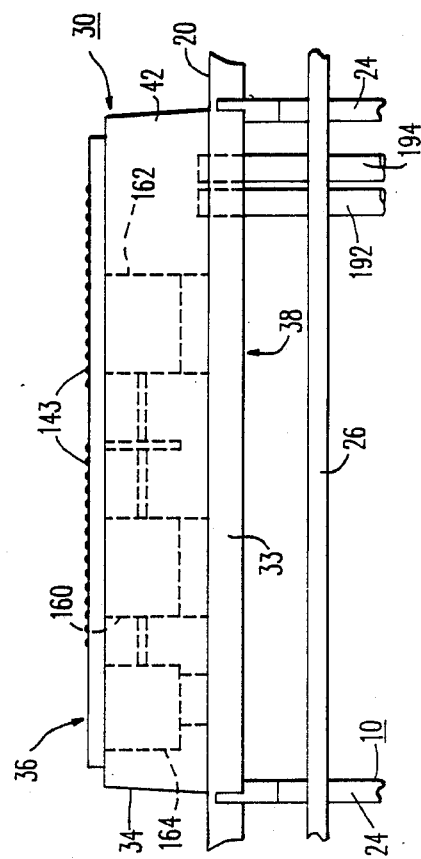
FIG. 6 is a side elevational view of the air conditioner unit shown in FIG. 4.

Suction and discharge lines 192 and 194 extend from unit 30 to the power pack 32, as best illustrated in FIGS. 5 and 6, proceeding through appropriate cavities in the side wall of bus 10. The bottom view of frame 34 in FIG. 3 illustrates openings 196 for accommodating the suction and discharge lines 192 and 194. Unit 30 may be rotated 180 degrees when the power pack 32 is mounted on the other side of the bus. Frame 34 also has a plurality of drain openings, such as openings 198 shown in FIG. 3, to which drain hoses, such as drain hose 200 (FIG. 5), are attached and directed down through cavities in the side walls 16 and 18 of bus 10 to exit near street level on the bottom of bus 10.

In summary, there has been disclosed a new and improved compact air conditioner unit 30 suitable for mounting on the roof of a bus, between any two adjacent, normally spaced support struts. Despite the small package size, which is only about 55 inches (1400 mm) long, about 75 inches (1900 mm) wide, and 10 inches (254 mm) high, unit 30 is capable of providing a cooling capacity of 85,000 BTU/Hr (21,420 Kcal/Hr) due to the splitting of both the evaporator and condenser functions into first and second coils, and the nesting of the two condenser coils between the two evaporator coils on a common frame.

I claim:

1. An air conditioner unit suitable for mounting on the roof of a vehicle, comprising:

a vehicle having a front, back, first and second sides, a passenger compartment, air delivery ducts for delivering conditioned air to the passenger compartment, conditioned air openings in the roof in communication with said air delivery ducts, and return air openings in the roof in communication with the passenger compartment, a frame having a bottom, top, first and second ends, first and second sides, and a longitudinal axis extending between said first and second ends, means fixing said frame to the roof of said vehicle, with the longitudinal axis of the frame oriented front to back on said vehicle, first and second elongated evaporator coils each having first and second ends and a longitudinal axis which extends between said first and second ends, said first and second evaporator coils being mounted in spaced relation on said frame, respectively spaced from the first and second sides of said frame, with the longitudinal axes of said first and second evaporator coils being parallel to the longitudinal axis of said frame, first and second evaporator air delivery means on said frame, respectively between said first side and said first evaporator coil, and between said second side and said second evaporator coil, openings in the bottom of said frame in registry with the conditioned air and the return air openings in the roof of said vehicle, such that each of the first and second evaporator air delivery means draws return air from the passenger compartment, through the associated evaporator coil, and discharges conditioned air into an air delivery duct of the vehicle, first and second elongated condenser coils each having first and second ends and a longitudinal axis which extends between the first and second ends, said first and second condenser coils being mounted in spaced relation on said frame, between and respectively adjacent to said first and second evaporator coils, with the longitudinal axes of said first and second condenser coils being parallel to the longitudinal axis of said frame, and condenser air delivery means mounted on said frame, between said first and second spaced condenser coils.

2. The air conditioner unit of claim 1 wherein the top of the frame includes openings for the condenser air delivery means and for the first and second condenser coils, with the condenser air delivery means being arranged to draw air downwardly into the frame via said openings for the condenser air delivery means, and to discharge air upwardly through the first and second condenser coils and associated frame openings.

3. The air conditioner unit of claim 1 wherein the vehicle includes a plurality of structural beams spaced from the front to the back, with the means fixing the frame to the roof fixing the frame to two adjacent structural beams.

4. The air conditioner unit of claim 1 including a refrigerant circuit which includes first and second expansion valves for the first and second evaporator coils, respectively.

5. The air conditioner unit of claim 1 wherein the first and second evaporator coils and the first and second condenser coils each have a midpoint, with the midpoints of the first and second evaporator coils and the midpoints of the first and second condenser coils all being in a common plane disposed perpendicular to the first and second sides of the vehicle.

6. The air conditioner unit of claim 1 wherein the first and second evaporator coils and the first and second condenser coils each have a face planes perpendicular to the direction of air flow, with the face planes of the first and second evaporator coils being vertically oriented and with the face planes of the first and second condenser coils being horizontally oriented.

7. The air conditioner unit of claim 1 including a refrigerant circuit having a receiver and a drier, with said receiver and drier being disposed between the first and second condenser coils, and wherein the top of the frame includes an access cover disposed over the receiver and drier.

8. The air conditioner unit of claim 1 wherein the top of the frame includes an access cover disposed over each of the evaporator coils.

9. The air conditioner unit of claim 1 wherein the frame includes first and second bulkheads disposed to define first and second evaporator compartments, and a condenser compartment between said first and second evaporator compartments.

10. The air conditioner unit of claim 1 including a power pack for the air conditioner unit, which includes a refrigerant compressor, mounted within the vehicle adjacent to a selected side thereof, and a refrigerant circuit which includes entry points on the frame, immediately adjacent to one side of the frame, enabling the frame to be mounted with either end towards the front of the vehicle, to place the refrigerant circuit entry points on the same side of the vehicle as the power pack.

11. The air conditioner unit of claim 1 wherein the dimension of the frame between the first and second ends does not exceed about 55 inches, the height of the frame does not exceed about 10 inches, and the width of the frame between the first and second sides exceeds the length of the frame between the first and second ends.

* * * * *